(12) United States Patent
Tabor

(10) Patent No.: US 7,766,042 B2
(45) Date of Patent: Aug. 3, 2010

(54) DIRECT OPERATED CARTRIDGE VALVE ASSEMBLY

(75) Inventor: Joseph Edward Tabor, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 776 days.

(21) Appl. No.: 11/581,840

(22) Filed: Oct. 16, 2006

(65) Prior Publication Data

US 2008/0087345 A1    Apr. 17, 2008

(51) Int. Cl.
*F15B 13/044*    (2006.01)

(52) U.S. Cl. .............................. 137/625.65; 137/625.25

(58) Field of Classification Search ............ 137/625.64, 137/625.65, 625.66, 625.25
See application file for complete search history.

(56) References Cited

U.S. PATENT DOCUMENTS

| | | | | |
|---|---|---|---|---|
| 3,219,060 A | * | 11/1965 | Pearl et al. ............. | 137/625.66 |
| 3,807,441 A | * | 4/1974 | Grosseau ................ | 137/625.65 |
| 4,304,264 A | | 12/1981 | McClintock et al. | |
| 4,579,145 A | * | 4/1986 | Leiber et al. ........... | 137/625.65 |
| 4,669,504 A | * | 6/1987 | Fujitsugu et al. ....... | 137/625.65 |
| 4,725,039 A | | 2/1988 | Kolchinsky | |
| 4,741,364 A | * | 5/1988 | Stoss et al. ............. | 137/625.64 |
| 4,899,785 A | * | 2/1990 | Inokuchi ................ | 137/625.65 |
| 5,121,769 A | * | 6/1992 | McCabe et al. ........ | 137/625.64 |
| 5,156,184 A | | 10/1992 | Kolchinsky | |
| 5,205,531 A | | 4/1993 | Kolchinsky | |
| 5,306,076 A | * | 4/1994 | Tyler ...................... | 137/625.65 |
| 5,309,944 A | * | 5/1994 | Chikamatsu et al. ... | 137/625.65 |
| 5,520,217 A | | 5/1996 | Grawunde | |
| 5,611,370 A | * | 3/1997 | Najmolhoda ........... | 137/625.64 |
| 5,794,651 A | | 8/1998 | Miller | |
| 5,842,679 A | | 12/1998 | Kolchinsky | |
| 5,906,351 A | * | 5/1999 | Aardema et al. ....... | 137/625.65 |
| 6,021,963 A | | 2/2000 | Coldren et al. | |
| 6,322,341 B1 | | 11/2001 | Haas | |
| 6,694,859 B2 | | 2/2004 | Smith | |

* cited by examiner

*Primary Examiner*—John Rivell
(74) *Attorney, Agent, or Firm*—Finnegan, Henderson, Farabow, Garrett & Dunner, LLC

(57) ABSTRACT

A cartridge valve assembly includes a body having a central bore, a first port, a second port, and a third port fluidly connected to the central bore. The cartridge valve assembly further includes a main spool positioned within the central bore and being movable between at least a first position and a second position. The main spool forms, within the central bore, a first chamber, and a second chamber, and a control chamber. The cartridge valve assembly also includes a first passage fluidly communicating the first chamber with the second chamber, and an actuator adapted to apply a force to a first end of the main spool. The cartridge valve assembly further includes a feedback spool having an end exposed to a feedback chamber formed within the body, and a second passage fluidly communicating the control chamber with the feedback chamber.

17 Claims, 4 Drawing Sheets

DIRECT OPERATED CARTRIDGE VALVE ASSEMBLY

TECHNICAL FIELD

The present disclosure relates generally to a cartridge valve assembly, and more particularly, to a direct operated cartridge valve assembly.

BACKGROUND

Work machines such as, for example, dozers, loaders, excavators, motor graders, and other types of heavy machinery typically include one or more hydraulic systems, such as brake systems, fuel systems, or other machine systems. Each of these systems generally includes one or more hydraulic actuators that operate by selectively being filled with or drained of pressurized fluid. Valve assemblies that control the flow of hydraulic fluid to and from these actuators of the system are typically called actuating valves.

During operation of an actuation valve, the stability of the fluid supplied to the valve may affect performance characteristics of the hydraulic system. For example, if the pressure of the fluid supplied through the control valve to the hydraulic system is too low, the force exerted by a tool (i.e., a brake, a cylinder, a motor, etc.) may likewise be too low. In contrast, if the pressure of the fluid supplied through the control valve to the hydraulic system is too high, the force may also be high and even possibly damaging to components of the hydraulic system. Further, if the pressure of the fluid varies significantly, the resulting force may oscillate unpredictably. When the pressure flowing through the actuation valve to the hydraulic system is too low, too high, or varies unpredictably, the resulting performance of the hydraulic system may be less than desired.

One way to improve the performance and predictability of the hydraulic system may be to employ another type of valve called a pressure relief valve. Pressure relief valves relieve pressure surges or peaks in the hydraulic system of the work machines, thereby ensuring desired system performance, while minimizing damage to the hydraulic system and improving efficiency of the hydraulic system. Pressure relief valves also help to maintain a desired pressure by creating a restriction or blocking flow.

One example of a pressure relief valve is described in U.S. Pat. No. 6,694,859 (the '859 patent) issued to Smith on Feb. 24, 2004. The '859 patent describes a pressure relief valve including a cartridge valve element assembly movable by an electric coil assembly to proportionally control the flow of fluid between an inlet port and an outlet port. The inlet port interconnects a pressure conduit and a force control chamber. The pressure of the fluid within the force control chamber acting on the valve element assembly urges the valve element assembly against the bias of a spring to control the flow of fluid between the inlet port and the outlet port. Once the pressure of the fluid within the force control chamber reaches a level sufficiently high, a force is created sufficient to overcome the force of the spring member and the valve element assembly moves in a direction to interconnect the force control chamber with the outlet port, thereby reducing the pressure in the force control chamber and the pressure conduit.

Although the system of the '859 patent may maintain a particular pressure within a hydraulic system by selectively relieving excessive pressures, the '859 patent can only be used as an add-on component. In particular, the system of the '859 patent does not also provide for controlled fluid to and/or from a hydraulic actuator. As an add-on system, the separate pressure relief valve increases cost, complexity, and unreliability.

The disclosed system is directed to overcoming one or more of the problems set forth above.

SUMMARY OF THE INVENTION

In one aspect, the present disclosure is directed to a cartridge valve assembly. The cartridge valve assembly may include a body having a central bore, a first port, a second port, and a third port fluidly connected to the central bore. The cartridge valve assembly may also include a main spool positioned within the central bore and being movable between at least a first position and a second position. The main spool may form, within the central bore, a first chamber, and a second chamber, and a control chamber. The cartridge valve assembly may also include a first passage fluidly communicating the first chamber with the second chamber, and an actuator adapted to apply a force to a first end of the main spool. The cartridge valve assembly may further include a feedback spool having an end exposed to a feedback chamber formed with the body and being adapted to apply a force to a second end of the main spool to urge the main spool to move from the second position to the first position, and a second passage fluidly communicating the control chamber with the feedback chamber.

In another aspect, the present disclosure is directed to a method of directly operating a cartridge valve assembly. The method may include applying a force to a first end of a main spool to force the main spool to move from a first position toward a second position to connect a pump with a fluid actuator through a control chamber of the cartridge valve assembly, and disconnect a tank with the fluid actuator through the control chamber of the cartridge valve assembly. The method may further include directing fluid from the control chamber to a feedback chamber. The fluid in the feedback chamber may apply a feedback pressure to a surface area of a feedback spool exposed to the fluid in the feedback chamber. The feedback pressure may be substantially equal to the fluid pressure in the control chamber. The feedback spool may apply a force to the main spool to move the main spool from the second position toward the first position. The method may further include when a force differential across the main spool reaches a predetermined value, moving the main spool from the second position toward the first position to disconnect the pump from the fluid actuator and connect the tank to the fluid actuator through the control chamber.

DETAILED DESCRIPTION

Figure 1:
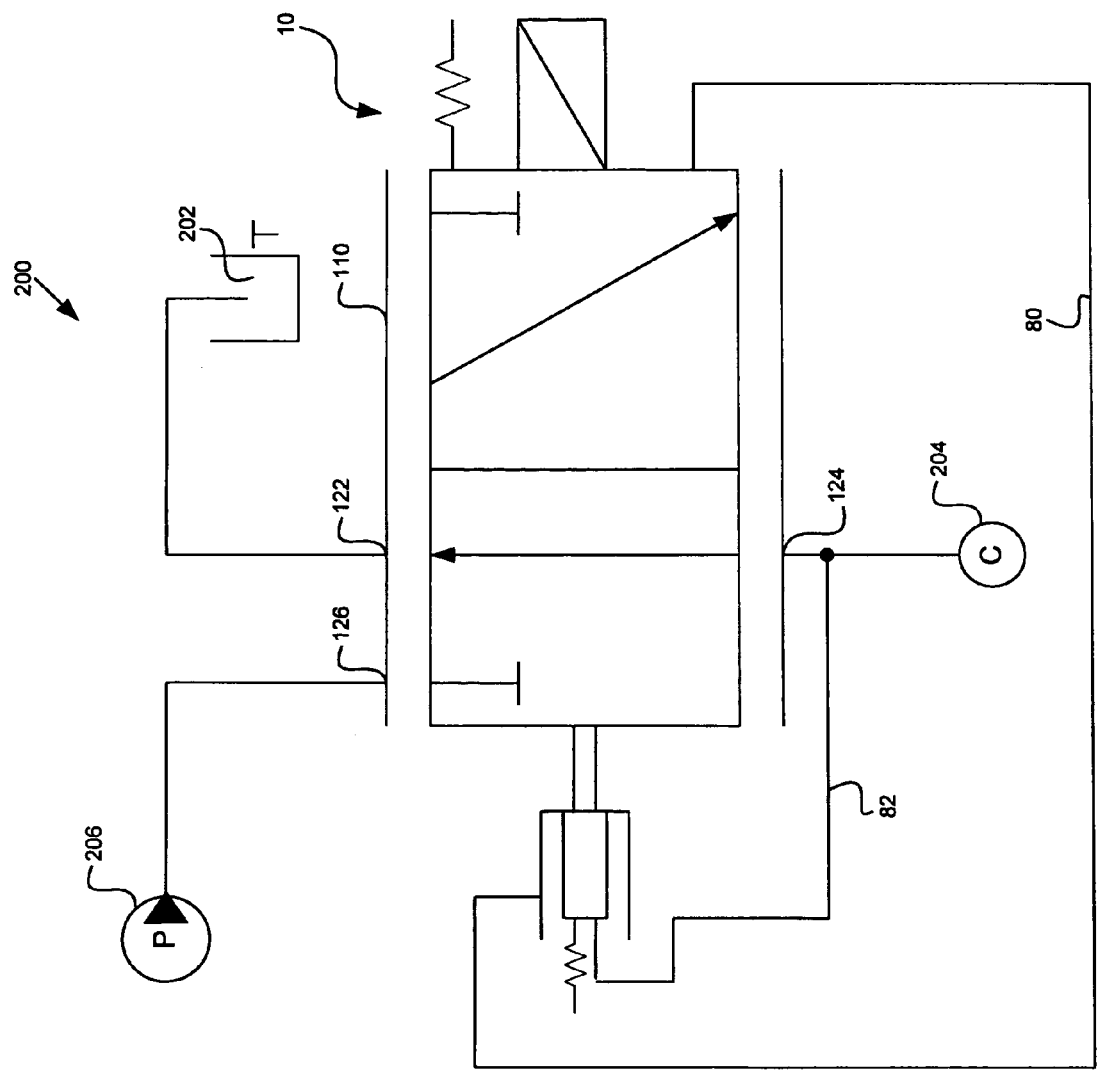
FIG. 1 is a schematic view of an exemplary disclosed fluid system.

FIG. 1 illustrates an exemplary hydraulic system 200 constructed according to one aspect of the present disclosure. The hydraulic system 200 may include a lower pressure passage or source, for example, a tank 202, a fluid actuator 204, a higher pressure passage or source, for example, a pump 206, and a cartridge valve assembly 10 fluidly connected to the tank 202, the fluid actuator 204, and the pump 206. The cartridge valve assembly 10 may be actuated to control fluid flow from the pump 206 to the fluid actuator 204, and from the fluid actuator 204 to the tank 202. The fluid actuator 204 can be used in a brake system, a fuel system, a transmission system, or other machine systems.

The cartridge valve assembly 10 may be received in a housing 110, which may be formed by walls of a manifold assembly, a casting, or other structure of a relevant system, or the housing may itself be adapted for insertion into a manifold assembly, a casting, or other structure where the cartridge valve assembly 10 is to be positioned. The housing 110 may include a first port 122, a second port 124, and a third port 126 that may be respectively connected to the tank 202, the fluid actuator 204, and the pump 206.

Figure 2:
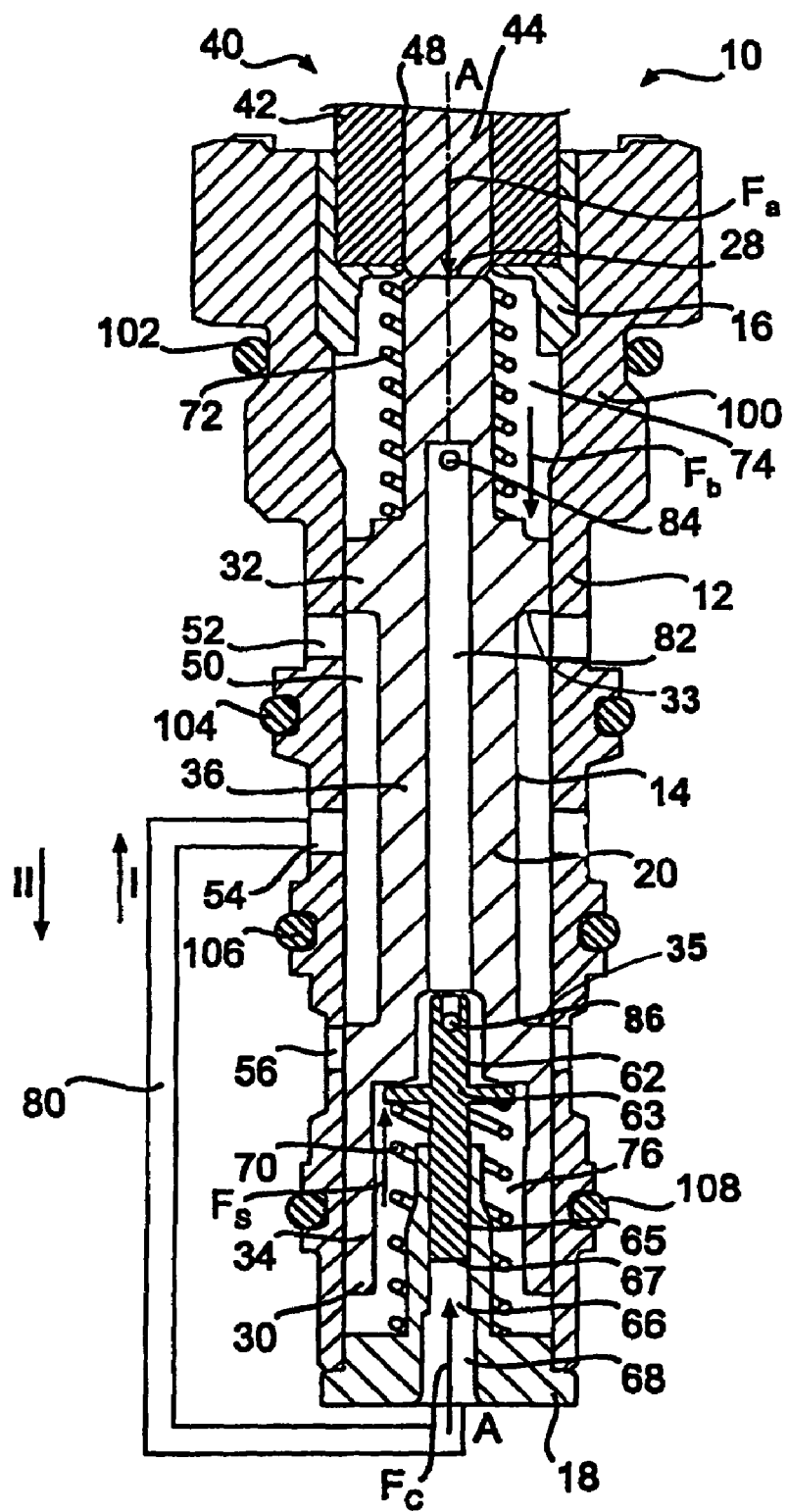
FIG. 2 is a cross-sectional view of an exemplary disclosed cartridge valve assembly for use with the fluid system of FIG. 1.

Referring to FIG. 2, the cartridge valve assembly 10 may include a body 12 extending along a central axis A, a main spool 20 received in the body 12, an actuator 40 for selectively moving the main spool 20 within the body 12, an adapter 100 coupled to one end of the body 12, and a feedback spool 62 adapted to apply a feedback force on the main spool 20.

The body 12 may include a first set of ports 52, a second set of ports 54, and a third set of ports 56. Each set of ports may include one or more axially aligned and radially oriented ports. When the cartridge valve assembly 10 is received in the housing 110, the first set of ports 52, the second set of ports 54, and the third set of ports 56 may be in fluid communication with the first port 122, the second port 124, and the third port 126 of the housing 110 respectively, and the cartridge valve assembly 10 may be fluidly connected to the tank 202 through the first set of ports 52 of the cartridge valve assembly 10 and the first port 122 of the housing 110, fluidly connected to the fluid actuator 204 through the second set of ports 54 of the cartridge valve assembly 10 and the second port 124 of the housing 110, and fluidly connected to the pump 206 through the third set of ports 56 of the cartridge valve assembly 10 and the third port 126 of the housing 110.

The body 12 may form a central bore 14 extending along the central axis A. The body 12 may further include a first stop member 16 attached to a first end of the body 12 and a second stop member 18 attached to a second end of the body 12. The second stop member 18 may include a central bore 66 extending along the central axis A.

The body 12 may include multiple sealing rings attached to an outer surface of the body 12. A first sealing ring 104 may be disposed between the first set of ports 52 and the second set of ports 54. A second sealing ring 106 may be disposed between the second set of ports 54 and the third set of ports 56. A third sealing ring 108 may be disposed between the third set of ports 56 and the second stop member 18. When the cartridge valve assembly 10 is disposed within the housing 110, the plurality of sealing rings 104, 106, and 108 sealingly engage an inner surface of the housing 110, such that the first set of ports 52 is fluidly connected to the first port 122 of the housing 110, but is separated from the other ports. (e.g., the second set of ports 54), and the second set of ports 54 is fluidly connected to the second port 124, but is separated from the other ports, the third set of ports 56 is fluidly connected to the third port 126, but is separated from the other ports.

The actuator 40 may be coupled to a first end 28 of the main spool 20 for selectively moving the main spool 20. In one embodiment, the actuator 40 may be a solenoid actuator including an electromagnetic coil 42 and an armature 44. The electromagnetic coil 42 may be located around and secured to a tube 48. The armature 44 may be positioned within the tube 48. When electric current is applied to the electromagnetic coil 42, an electromagnetic field may be created, and in response, the armature 44 may be urged to slide within the cartridge tube 48. The armature 44 may be adapted to apply a force to a surface of the first end 28 to move the main spool 20 in a direction indicated by an arrow labeled II.

The adapter 100 may include a central concave portion or a central bore for receiving the body 12. The body 12 may be attached to the adapter 100 by threaded fastening or other means. The adapter 100 may be at least partially inserted into a cartridge cavity. The adapter 100 may include a sealing ring 102 attached to an outer surface of the adapter 100. The sealing ring 102 may be adapted to sealingly engage an inner surface of the cartridge cavity to prevent fluid from flowing out of the cartridge cavity.

The main spool 20 may be received within the central bore 14 of the body 12 and may be movable between at least a first position and a second position. The main spool 20 may include a first end section 32, a second end section 34, and an intermediate section 36. The first section 32 of the main spool 20, in conjunction with the first stop member 16, may form a first chamber 74 within the central bore 14. A balance spring 72 may be received in the first chamber 74 and positioned between the main spool 20 and the first stop member 16. The second section 34 of the main spool 20, in conjunction with the second stop member 18, may form a second chamber 76 within the central bore 14. The intermediate section 36 of the main spool 20 may have a relatively smaller diameter than the first end section 32 and the second end section 34, such that an outer surface of the intermediate section 36 and an inner surface of the central bore 14 of the body 12 may form a control chamber 50 within the central bore 14. The second set of ports 54 may be continuously fluidly connected to the control chamber 50. The first set of ports 52 and the third set of ports 56 may be selectively opened to the control chamber 50 by sliding the main spool 20 within the central bore 14 between the first and second positions.

The main spool 20 may further include a central passage/first passage 82 extending along the central axis A. The central passage 82 may include a first opening 84 defined on walls of the main spool 20 fluidly connecting the central passage 82 to the first chamber 74, and a second opening 86 defined on the feedback spool 62 fluidly connecting the central passage 82 to the second chamber 76. The first chamber 74 at the first end 28 of the main spool 20 and the second chamber 76 at a second end 30 of the main spool 20 may be in continuous fluid communication through the central passage 82, such that the pressure on one side of the main spool 20 may always be substantially equal to the pressure on the other side of the main spool 20, and thereby only a relatively small activating force may be needed to move the main spool 20 from the first position to the second position. Through the cartridge valve assembly 10, a relatively small solenoid force Fa can be used as an input to direct operate the cartridge valve assembly 10.

The feedback spool 62 may be received in the second chamber 76. The feedback spool 62 may include a first section 63 received in the second chamber 76, and a second section 65 slidably received in the central bore 66 of the second stop member 18. The second section 65 may include a second end surface 67, which, together with inner walls of the central bore 66, may form a feedback chamber 68 within the central bore 66. A feedback spring 70 may be received in the second chamber 76 and positioned between the feedback spool 62 and the second stop member 18. The feedback spring 70 and the balance spring 72 may help to keep the main spool 20 stable in the central bore 14.

The feedback chamber 68 and the control chamber 50 may be fluidly connected through a feedback passage/second passage 80. The second passage 80 may be external to the cartridge valve body 12, for example, positioned in a manifold or housing, which receives the cartridge valve body 12. The second passage 80 may transmit the pressure in the control chamber 50 to the feedback chamber 68 within the second stop member 18, in which the pressure is applied to the second end surface 67 of the feedback spool 62. Since the control chamber 50 is fluidly connected with the feedback chamber 68 through the second passage 80, the pressure in the feedback chamber 68 may maintain substantially the same pressure as in the control chamber 50. Thus, when the pressure in the control chamber 50 increases or decreases, the pressure in the feedback chamber 68 and subsequently the force generated at second end surface 67 may also increase or decrease;

In one embodiment, a surface area 33 of the first end section 32 of the main spool 20 that the control pressure in the control chamber 50 is applied on to create a force in the direction I is substantially the same as a surface area 35 of the second end section 34 of the main spool 20 that the control pressure is applied on to generate a force in the direction II. In this example, the feedback spool 62 may have a relatively small diameter, for example, 2 mm.

Figure 4:
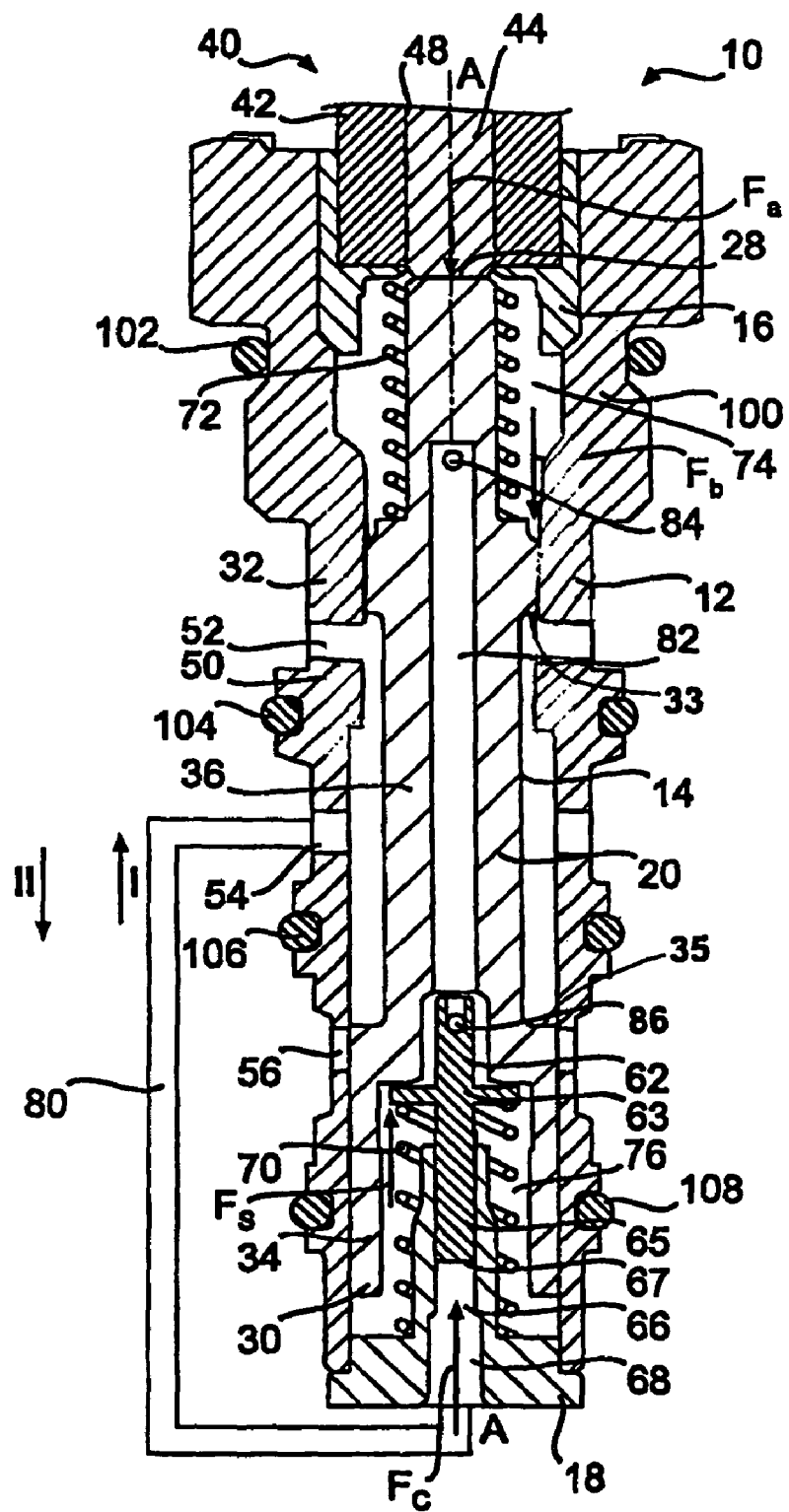
FIG. 4 is a cross-sectional view of another exemplary disclosed cartridge valve assembly for use with the fluid system of FIG. 1.

In another embodiment, as shown in FIG. 4, the area 33 of the first end section 32 may be smaller than the area 35 of the second end section 34, so that the control pressure in the control chamber 50 applies a relatively larger force on the surface 35 than the surface 33, which creates a force differential between the two surfaces. In this embodiment, a relatively large feedback force in the direction I is needed to overcome the force differential. In order to generate a relatively large feedback force, a feedback spool 62 with a relatively large surface area is needed, which may be easier to be manufactured than a relatively small feedback spool. In one example, the feedback spool may have a relatively large diameter, for example, 8 mm. A larger feedback spool may need the diameter of the feedback chamber larger, so that the feedback chamber may be more difficult to become jammed.

FIG. 2 shows the main spool 20 in the first position, in which the third set of ports 56 are closed to the control chamber 50, and the first set of ports 52 are open to the control chamber 50. When the first set of ports 52 are open to the control chamber 50, the fluid in the fluid actuator 204 may flow through the second set of ports 54 (which is fluidly connected to the second port 124 of the cartridge valve assembly 10) to the control chamber 50, and through the first set of ports 52 (which is fluidly connected to the first port 122 of the housing 110) to the tank 202. The fluid actuator 204 may be used to drive a work element, for example, a brake mechanism at or near the wheel of a vehicle. When the fluid actuator 204 is emptied, the brake mechanism may be released to its home position.

Figure 3:
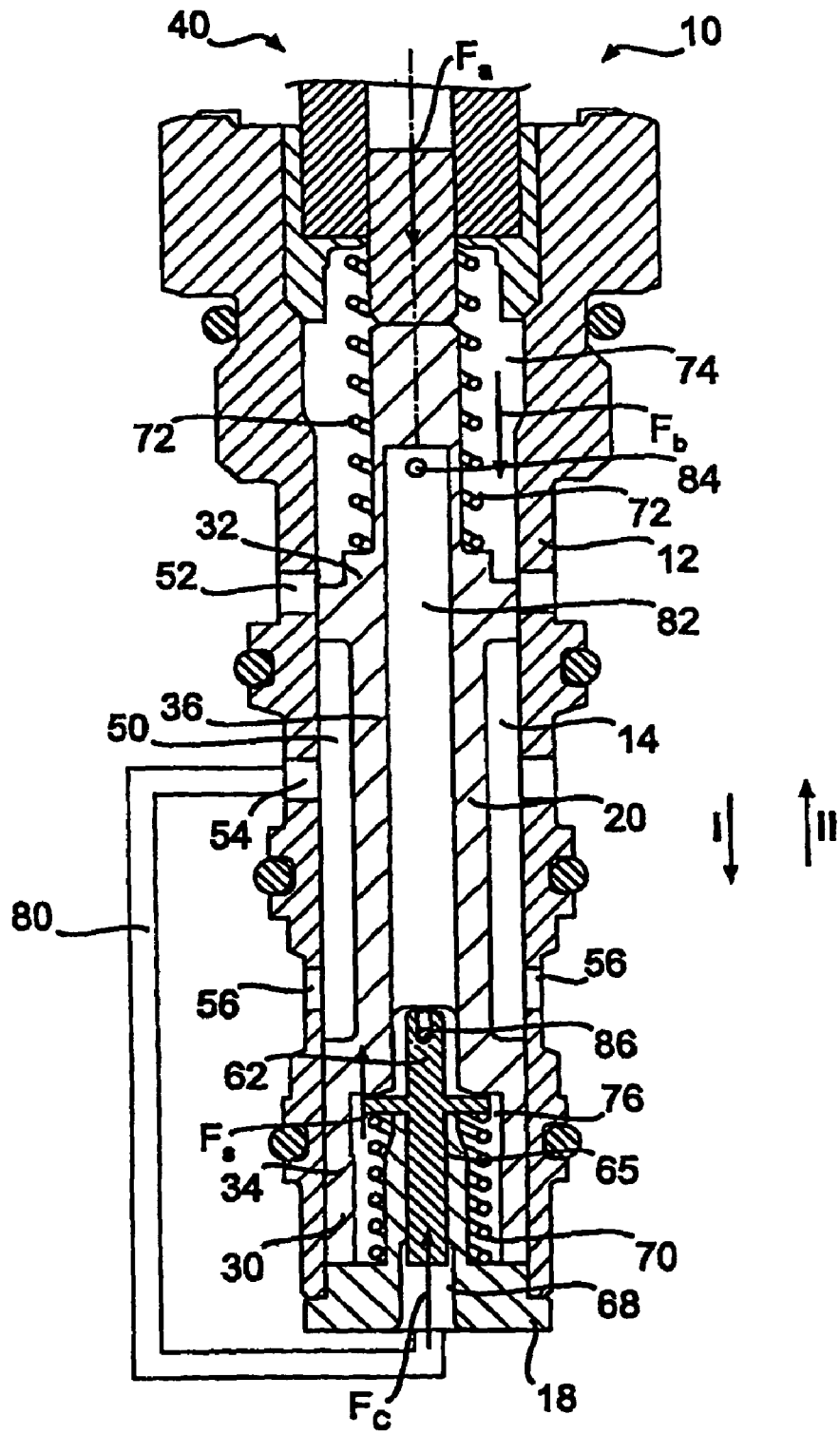
FIG. 3 is another cross-sectional view of the cartridge valve assembly of FIG. 2.

FIG. 3 shows that when the solenoid actuator 40 is activated, the main spool 20 may be forced downward to the second position by the armature 44. In the second position, the first set of ports 52 are closed to the control chamber 50, and the third set of ports 56 are open to the control chamber 50. When the main spool 20 is in the second position as shown in FIG. 3, the third set of ports 56 are open to the control chamber 50, allowing the fluid from the pump 206 to flow through the third set of ports 56 (which is fluidly connected to the third port 126 of the housing 110) to the control chamber 50, and through the second set of ports 54 to the fluid actuator 204. When the fluid actuator 204 is filled, the fluid actuator 204 may drive the work element, for example, the brake mechanism toward the wheel of the vehicle.

When the pressure in the control chamber 50 is increased, the increased pressure in the control chamber 50 may go through the second passage 80 to the feedback chamber 68. The feedback force generated by the fluid pressure in the feedback chamber 68 may also increase, which may move the main spool 20 to the first position, and opens the control chamber 50 to the first set of ports 52. The control chamber 50 may be then fluidly connected to the tank 202 through the first set of ports 52, and the pressure in the control chamber 50 may be relieved.

INDUSTRIAL APPLICABILITY

The disclosed cartridge valve assembly may be used in many applications, such as, pressure control, flow control, and pressure relief. For example, the disclosed cartridge valve assembly may be used to control a fluid actuator that may be used in brake systems, fuel systems, transmission systems, or other machine systems. The disclosed valve assembly may provide high-response pressure regulation that may result in consistent and predictable fluid actuator performance by way of a low-cost, simple configuration. The operation of cartridge valve assembly 10 will now be explained.

When the actuator 40 is de-energized, the main spool 20 of the cartridge valve assembly 10 may be continuously urged toward the first position by a force Fs applied in the direction I by the feedback spring 70 received in the second chamber 76 and fluid pressure in feedback chamber 68. When the main spool 20 is in the first position, as shown in FIG. 2, the first set of ports 52 may be open to the control chamber 50, and the third set of ports 56 may be closed to the control chamber 50, allowing the fluid in the fluid actuator 204 to flow through the second set of ports 54 to the control chamber 50, and through the first set of ports 52 to the tank 202.

When a current is applied to the electromagnetic coil 42 of the actuator 40, the armature 44 of the actuator 40 may apply a force Fa to the first end 28 of the main spool 20 to urge the main spool 20 toward the second position in the direction II. After the main spool 20 is moved to the second position, the first set of ports 52 may be closed to the control chamber 50 since the first section 32 of the main spool 20 may block the first set of ports 52, and the third set of ports 56 may be opened to the control chamber 50. When the control chamber 50 is fluidly connected to the third set of ports 56, the fluid may flow from the pump 206 to the control chamber 50 through the third set of ports 56 and may cause the fluid pressure in the control chamber 50 to increase.

The fluid in the control chamber 50 may also flow through the second passage 80 into the feedback chamber 68 to increase the feedback pressure in the feedback chamber 68. The increasing feedback pressure in the feedback chamber 68 may act on the end surface 67 of the feedback spool 62, and may apply a force Fc to the feedback spool 62, and through the feedback spool 62 to the main spool 20 in the direction I. The feedback spring 70 may also apply the force Fs to the main spool 20 in the direction I. Since the control chamber 50 is fluidly connected with the feedback chamber 68 through the second passage 80, the control pressure in the control chamber 50 may be substantially equal to the feedback pressure in the feedback chamber 68. When the control pressure in the control chamber increases, the feedback pressure in the feedback chamber 68 may also increase, which results in the feedback force Fc applied by the feedback pressure to the feedback spool 62 in the direction I to increase.

When the force Fc applied by the feedback pressure together with the force Fs applied by the feedback spring 70 is greater than the force Fa applied by the armature 44 and a force Fb applied by the balance spring 72, the main spool 20 may be urged to move from the second position toward the first position. As the main spool 20 moves toward the first position, the first set of ports 52 may begin to open to the control chamber 50, allowing some of the fluid to flow from the fluid actuator 204 through the control chamber 50 to the tank 202, which may cause the pressure in the control chamber 50 to decrease. The feedback pressure in the feedback chamber 68 may be connected to the control chamber 50 through the second passage 80 and thus the force Fc applied by the feedback pressure may also decrease.

When the actuator 40 is actuated again, the force Fa applied by the armature 44 may force the main spool 20 to move downward again from the first position to the second position to close the first set of ports 52 and open the third set of ports 56 to the control chamber 50. When the third set of ports 56 are opened, the fluid flowing from the pump 206 to the control chamber 50 may cause the fluid pressure in the control chamber 50 to increase again, and that may cause the feedback pressure to increase again.

In one embodiment, the cartridge valve assembly 10 may be used as a variable pressure regulator. In this embodiment, the actuator 40 may be selectively actuated to vary the pressure in the hydraulic system 200. A desired range of the output control pressure can be achieved by adjusting the solenoid force directly applied on the main spool 20. A greater solenoid force may create a greater control pressure in the control chamber 50. When the control pressure is higher than the desired range, the higher control pressure may cause the feedback pressure to increase, and that may cause the main spool 20 to move toward the first position and open the control chamber 50 to the tank 202 through the first set of ports 52, so that the control pressure may be lowered. When the control pressure is lower than the predetermined range, the feedback pressure is lower since it is connected to the control pressure through the second passage 80, and the activating force may be larger than the feedback force. The increased feedback force will move the main spool 20 toward the second position to open the control chamber 50 to the pump 206, and as a result, the control pressure may be increased.

In another embodiment, the cartridge valve assembly 10 may be used as a pressure relief valve. In this embodiment, the actuator 40 may be kept on at constant force or kept off. When the control pressure is increased, the feedback pressure is increased since the feedback chamber 68 is connected to the control chamber 50 through the second passage 80. When the feedback force Fc applied by the feedback pressure together with the force Fs applied by the feedback spring 70 is greater than the force Fa applied by the armature 44 and a force Fb applied by the balance spring 72, the main spool 20 is urged to move from the second position toward the first position. As the main spool 20 moves toward the first position, the first set of ports 52 may begin to open to the control chamber 50, allowing some of the fluid to flow from the control chamber 50 to the tank 202 through the first set of ports 52, which may cause the pressure in the control chamber 50 to decrease. Therefore, the pressure in the fluid actuator 204 connected to the control chamber 50 may be relieved.

Several advantages over the prior art may be associated with the disclosed system. The disclosed system may provide a cartridge valve assembly integrating actuation and pressure relief functions into one assembly, so that it may not only provide high pressure actuation fluid to an actuator, but also provide responsive pressure relief for the actuator to avoid any damage due to high fluid pressure to the actuator.

It will be apparent to those skilled in the art that various modifications and variations can be made to the cartridge valve assembly. Other embodiments will be apparent to those skilled in the art from consideration of the specification and practice of the disclosed cartridge valve assembly. It is intended that the specification and examples be considered as exemplary only, with a true scope being indicated by the following claims and their equivalents.

What is claimed is:

1. A cartridge valve assembly comprising:
a body having a central bore, a first port, a second port, and a third port fluidly connected to the central bore;
a main spool having a first end and a second end positioned within the central bore between a first stop member and a second stop member, the main spool movable between at least a first position and a second position, wherein the main spool forms, within the central bore, a first chamber between the first end and the first stop member, a second chamber between the second end and the second stop member, and a control chamber between the first and second ends;
a balance spring positioned in the first chamber and adapted to apply a force at the first end of the main spool;
a first passage fluidly coupling the first chamber to the second chamber;
an actuator adapted to apply a force to the first end of the main spool;
a feedback spool positioned in the second chamber, the feedback spool having a distal end section slidably positioned in a central bore of the second stop member to form a feedback chamber;
a feedback spring positioned in the second chamber around a section of the feedback spool and the second stop member, and adapted to apply a force at the second end of the main spool and urge the main spool from the second position to the first position; and
a second passage fluidly communicating the control chamber with the feedback chamber.

2. The cartridge valve assembly of claim 1, wherein the balance spring is positioned around a section of the main spool and adapted to urge the main spool from the first position to the second position.

3. The cartridge valve assembly of claim 1, wherein the first passage is defined within the main spool.

4. The cartridge valve assembly of claim 1, wherein the second passage is positioned outside of the body.

5. The cartridge valve assembly of claim 1, wherein the feedback chamber is at least partly defined by an end surface of the distal end section of the feedback spool and inner walls of the central bore of the second stop member.

6. The cartridge valve assembly of claim 1, wherein the main spool includes a first end section, a second end section and an intermediate section, wherein the intermediate section has a smaller diameter than the first end section and the second end section, and the intermediate section and the central bore of the body form the control chamber.

7. The cartridge valve assembly of claim 6, wherein the surface area of the first end section of the main spool adapted to be in contact with fluid in the control chamber is smaller than the surface area of the second end section of the main spool adapted to be in contact with fluid in the control chamber.

8. The cartridge valve assembly of claim 1, further including a housing forming a cavity, and including a first port, a second port, and a third port fluidly connected to the cavity, wherein the body is received in the cavity, and the first port, the second port, and the third port of the body are respectively in fluid communication with the first port, the second port, and the third port of the housing.

9. The cartridge valve assembly of claim 1, wherein the actuator is a solenoid actuator including an armature coupled to the first end of the main spool to apply the force to the first end of the main spool.

10. A method of operating a cartridge valve assembly, the method comprising:
applying a force to a first end of a main spool of the cartridge valve assembly using a balance spring positioned in a first chamber around a first section of the main spool to move the main spool from a first position to a second position, the main spool being slidably positioned within a body of the cartridge valve assembly between a first stop member at the first end and a second stop member at an opposite second end to define the first chamber at the first end, a second chamber at the second end, and a control chamber between the first and second ends, the first position being a position in which a tank port of the body is fluidly coupled to a fluid actuator port of the body through the control chamber, and the second position being a position in which the tank port is fluidly decoupled from the fluid actuator port and a pump port of the body is fluidly coupled to the fluid actuator port through the control chamber, the tank port being at least partially exposed to the first chamber in the second position;
directing fluid from the control chamber to a feedback chamber situated within the second stop member, wherein the fluid in the feedback chamber applies a feedback pressure to a surface of a feedback spool slidably positioned in the feedback chamber, the feedback pressure being substantially equal to the fluid pressure in the control chamber, and wherein the feedback spool applying a force to the main spool to move the main spool from the second position toward the first position; and
applying a force at the second end of the main spool using a feedback spring positioned in the second chamber to move the main spool from the second position to the first position to fluidly decouple the pump port from the fluid actuator port and fluidly couple the tank port to the fluid actuator port through the control chamber.

11. The method of claim 10, further including connecting the first chamber to the second chamber to balance the pressure at the first end of the main spool and the second end of the main spool.

12. A hydraulic actuation system comprising:
a housing forming a cavity, and including a first port, a second port, and a third port fluidly connected to the cavity;
a first pressure source fluidly connected to the first port of the housing;
a fluid actuator fluidly connected to the second port of the housing;
a second pressure source fluidly connected to the third port of the housing, wherein the second pressure source has a relatively higher pressure than the first pressure source; and
a cartridge valve assembly including:
a body adapted to be inserted into the cavity of the housing, and including a central bore extending along a central axis, a first port, a second port, and a third port fluidly connected to the central bore, wherein the first port, the second port, and the third port of the body are respectively in fluid communication with the first port, the second port, and the third port of the housing;
a main spool positioned within the central bore and being movable between at least a first position and a second position, wherein the main spool forms, within the central bore, a first chamber at a first end of the main spool, a second chamber at an opposite second end of the main spool, and a control chamber between the first and second ends,
an actuator adapted to apply a force to the first end of the main spool;
a balance spring positioned in the first chamber around a first end section of the main spool and adapted to apply a force at the first end of the main spool;
a feedback spool positioned in the second chamber having an end surface exposed to a feedback chamber that is fluidly coupled to the control chamber, the feedback spool being adapted to apply a force to the second end of the main spool;
a feedback spring positioned in the second chamber and adapted to apply a force at the second end of the main spool; and
a first passage fluidly communicating the first chamber with the second chamber.

13. The hydraulic actuation system of claim 12, wherein the feedback spring is adapted to urge the main spool from the second position to the first position.

14. The hydraulic actuation system of claim 12, wherein the actuator adapted to apply a force to the first end of the main spool is a solenoid actuator including an armature coupled to the first end of the main spool to apply the force to the first end of the main spool.

15. The hydraulic actuation system of claim 12, wherein the body includes a stop member at the second end of the body including a central bore therein, and wherein the feedback chamber is formed within the central bore of the stop member.

16. The cartridge valve assembly of claim 12, wherein the first passage is defined within the main spool.

17. The hydraulic actuation system of claim 12, wherein the second passage is positioned outside of the body.

* * * * *